United States Patent
Takeda et al.

(10) Patent No.: US 7,181,191 B2
(45) Date of Patent: Feb. 20, 2007

(54) OUTLET TAP, POWER SOURCE CUT-OFF SYSTEM, AND POWER SOURCE CUT-OFF METHOD

(75) Inventors: Takeshi Takeda, Tokyo (JP); Tetsuo Wakabayashi, Tokyo (JP)

(73) Assignee: Temco Japan Co., Ltd., Tokyo (JP)

( * ) Notice: Subject to any disclaimer, the term of this patent is extended or adjusted under 35 U.S.C. 154(b) by 116 days.

(21) Appl. No.: 10/518,442

(22) PCT Filed: Jun. 17, 2003

(86) PCT No.: PCT/JP03/07668

§ 371 (c)(1),
(2), (4) Date: Dec. 17, 2004

(87) PCT Pub. No.: WO03/107490

PCT Pub. Date: Dec. 24, 2003

(65) Prior Publication Data

US 2005/0227742 A1  Oct. 13, 2005

(30) Foreign Application Priority Data

Jun. 17, 2002  (JP) ............................. 2002-176022

(51) Int. Cl.
*H04M 7/20* (2006.01)
*G05B 11/01* (2006.01)

(52) U.S. Cl. .............................. 455/404.1; 340/310.11; 340/288

(58) Field of Classification Search ............. 455/404.1, 455/404.2, 422.1, 41.2, 67.11, 115.1, 423, 455/572, 66.1, 41, 343.2; 340/825.36, 426.18, 340/521, 538, 539.1, 310.11, 288
See application file for complete search history.

(56) References Cited

U.S. PATENT DOCUMENTS

| | | | | |
|---|---|---|---|---|
| 5,668,538 A | * | 9/1997 | Warwick | 340/870.02 |
| 5,978,457 A | * | 11/1999 | Feuerstein et al. | 379/142.06 |
| 6,380,852 B1 | * | 4/2002 | Hartman et al. | 340/521 |
| 6,700,224 B2 | * | 3/2004 | Biskup et al. | 307/116 |
| 6,756,998 B1 | * | 6/2004 | Bilger | 715/764 |
| 6,794,991 B2 | * | 9/2004 | Dungan | 340/632 |
| 2004/0196142 A1 | * | 10/2004 | Berg | 340/7.1 |

* cited by examiner

*Primary Examiner*—Sonny Trinh
(74) *Attorney, Agent, or Firm*—Schmeiser, Olsen & Watts (57) ABSTRACT

A power source cut-off system enabling the user to cut off power supply from an outlet even when user is out comprises an outlet tap for supplying power to an electric apparatus by connecting it to a home commercial power source and a telephone set for controlling this outlet tap and connected to an external telephone line. The outlet tap comprises an outlet to which the electric apparatus is connected, a power cut-off means for cutting off the power source at this outlet, a reception means for receiving a radio signal transmitted from the external telephone line, and a control means for cutting off the power source at the outlet by the power source cut-off device according to the radio signal received by this reception means. The telephone set comprises a control signal reception means for receiving a control signal transmitted via an external communication apparatus, and a transmission means for transmitting a radio signal to the outlet tap on the basis of the control receiving means.

8 Claims, 5 Drawing Sheets

OUTLET TAP, POWER SOURCE CUT-OFF SYSTEM, AND POWER SOURCE CUT-OFF METHOD

TECHNICAL FIELD

The present invention relates to an outlet tap, a power source cut-off system and a power source cut-off method, and more particularly to an outlet tap, a power source cut-off system and a power source cut-off method, which enables a user to shut down the power supply of his or her electrical appliance through a telephone line even when the user is out of his or her house.

BACKGROUND ART

Heretofore, an outlet tap provided with a timer for interrupting the power supply of each of electrical appliances has been known as a power source cut-off device for interrupting the power supply of each of the electrical appliances. In this case, such a power source cut-off device merely performs an on/off switching operation of each of the electrical appliances according to a preset time schedule of the timer. Due to this, this conventional type of power source cut-off device fails to take countermeasure against the failure of cut-off or interrupting operation of the power supply of each electrical appliance at a time when the user goes out of his or her house.

On the other hand, the whole of today's society becomes a family-centered or a person-centered system. A family is a core of this system. In a house of the family, a so called "home automation" is now being realized. In such a home automation, the house of each family is linked to a global network.

The term "home automation" means a centralized control system in which all the electrical household appliances are connected with each other through a home network. In the case where such control system is realized, it is possible for a user, who is at a site away from his or her house, to interrupt the power supply of the electrical appliance of the house even when the electrical appliance is not switched off when the user goes out of the house.

However, with respect to an electrical appliance to be controlled in the home automation, it is necessary for such an electrical appliance to have a special means for communicating with a master computer in control. Due to this, it is not possible for the user to use his or her current electrical appliances, which appliances the user has already possessed in his or her house. In other words, the home automation is essentially introduced into a newly built house. In addition, the home automation is considerably expensive in its introduction into the house. Due to this, it seems probable that some considerable period of time is required in the spread of the home automation in use in the public at large.

Further, it seems that various data processing techniques such as a voice recognition technique, a data processing technique of human-sensibility information and the like are required in a realization of the home automation. Consequently, it will be very hard for an advanced-age user for example to understand and use the system of home automation since such an advanced-age user is generally unwilling to use a computer.

Under such circumstances, the present invention was made. Consequently, it is an object of the present invention to provide an outlet tap, a power source cut-off system and a power source cut-off method, which enables the user being at a site away from his or her house to interrupt the power supply of the electrical appliance in the user's house in order to prevent a bad fire from occurring in the user's house while he or she is absent even when he or she fails to switch off the power supply of the electrical appliance in going out of his or her house, wherein the electrical appliance comprises an electric heater, an electric cooking stove, an electric iron and like electrical household appliances used at elevated temperature in the user's house.

DISCLOSURE OF THE INVENTION

In order to solve the above problem, an outlet tap of the present invention, which outlet tap is provided with an outlet and connected with a domestic commercial power source to supply electric power to an electric appliance having been connected with the outlet, is characterized in that the outlet tap comprises a power source cut-off device for interrupting the electric power source in the outlet; a radio receiver means for receiving a control signal through a radio communication line; and, a control means for controlling the power source cut-off device on the basis of the control signal having been received in the radio receiver means.

Preferably, the outlet tap further comprises: a result signal generator means for generating a result signal representing the result of power source cut-off performance of the power source of the electrical appliance, the power source cut-off performance being carried out at the outlet; and, a radio transmitter means for transmitting the result signal through a radio communication line, the result signal being issued from the result signal generator means.

A power source cut-off system of the present invention for solving the above problem is constructed of: an outlet tap which is connected with a domestic commercial power source to supply electric power to an electrical appliance; and, a telephone set connected with an external telephone line to control the outlet tap, and characterized in that the outlet tap comprises: an outlet with which the electrical appliance is connected; a power source cut-off device for interrupting the power source at the outlet; a receiver means for receiving a radio signal issued from the telephone set; and, a control means for controlling the power source cut-off device on the basis of the radio signal having been received in the receiver means, and characterized in that the telephone set comprises: a control signal receiver means for receiving a control signal having been transmitted through the external telephone line; and, a transmitter means for transmitting the radio signal to the outlet tap on the basis of the control signal receiver means.

Preferably, the outlet tap further comprises: a signal generator means for showing the result of power source cut-off operation carried out with respect to the electrical appliance at the outlet; and, a transmitter means for transmitting the radio signal representing the result of the power source cut-off operation to the telephone set, wherein the telephone set further comprises a receiver means for receiving the radio signal having been transmitted from the transmitter means of the outlet tap.

Further, preferably the telephone set further comprises a voice guide choosing means for choosing a voice guide in report of the result in analysis of the result of the power source cut-off operation on the basis of the radio signal having been received in the receiver means, the power source cut-off operation being conducted in the outlet of the outlet tap; and, a playback means for reproducing the voice guide, wherein the voice guide reports the result to a user having been selected by the voice guide choosing means.

A power source cut-off system of the present invention for solving the above problem is constructed of: an outlet tap which is connected with a domestic commercial power source to supply electric power to an electrical appliance, and, a telephone set connected in between an external telephone line and a telephone set to control the outlet tap, characterized in that the outlet tap comprises: an outlet with which the electrical appliance is connected; a power source cut-off device for interrupting the power source at the outlet; a receiver means for receiving a radio signal issued from the power source cut-off device; and, a control means for controlling the power source cut-off device on the basis of the radio signal having been received in the receiver means, and characterized in that the power source cut-off device comprises: a control signal receiver means for receiving a control signal having been transmitted through the external telephone line; and, a transmitter means for transmitting the radio signal to the outlet tap on the basis of the control signal receiver means.

Preferably, the outlet tap comprises: a signal generator means for showing the result in power source cut-off operation of the electrical appliance conducted at the outlet; and, a transmitter means for radio transmitting a radio signal representing the result in power source cut-off operation to the power source cut-off device, the radio signal representing the result in power source cut-off operation being prepared in the signal generator means, wherein the power source cut-off device further comprises a receiver means for receiving the radio signal issued from the transmitter means of the outlet tap.

Further, preferably the power source cut-off device further comprises: a voice guide choosing means for choosing a voice guide in report of the result in analysis of the result of the power source cut-off operation on the basis of the radio signal having been received in the receiver means, the power source cut-off operation being conducted in the outlet of the outlet tap; and, a playback means for reproducing the voice guide, wherein the voice guide reports the result to a user having been selected by the voice guide choosing means.

Further, preferably the power source cut-off device comprises: a phone-call reply meant for replying a phone call; a confirmation means for confirming whether or not the phone call contains a preset power source cut-off number in reply to the phone call; and, a power source cut-off operation carrying out means for carrying out the power source cut-off operation on the basis of the phone call in the case where the phone call contains the preset power source cut-off number which is confirmed by the confirmation means.

Still further, a power source cut-off system of the present invention for solving the above problem serves as a remote control system for remotely controlling an outlet tap, wherein the outlet tap is an object to be controlled by means of an external communication instrument through a telephone line, characterized in that: the power source cut-off system comprises a call center which is connected with the telephone line, corresponds a telephone subscriber and manages the data of the subscriber, wherein the subscriber's data includes a subscriber's telephone number in his or her house; and, a power source cut-off device for catching a phone call issued from the call center through the telephone line to perform the control of a power source cut-off operation.

Further, a power source cut-off method of the present invention for solving the above problem serves as a remote control method for remotely controlling an outlet tap, wherein the outlet tap is an object to be controlled by means of an external communication instrument through a telephone line, characterized in that: the power source cut-off method comprises the steps of presetting the data of a subscriber in a database server of a call center, wherein the data of the subscriber corresponds to the subscriber and includes a telephone number of the subscriber in his or her house; storing and recognizing the result of a search for the data of the subscriber in arrival information issued from telephone sets of subscribers; and, issuing a phone call to the house of the subscriber on behalf of the subscriber through a telephone line on the basis of the contents of the data of the subscriber having been stored; and, performing the control of a power source cut-off operation on the basis of the telephone number of the telephone set which has received the phone call in the previous step of issuing the phone call.

Preferably, in the step of presetting, a plurality of the data of subscribers are provided in the database server; and, in the step of storing and recognizing, the data of one of the subscribers who has made a phone call is searched to make a return call to the one of the subscribers.

Further, preferably a telephone number capable of initiating the power source cut-off operation is limited to those having been registered in the call center.

BEST MODES FOR CARRYING OUT THE INVENTION

Figure 1:
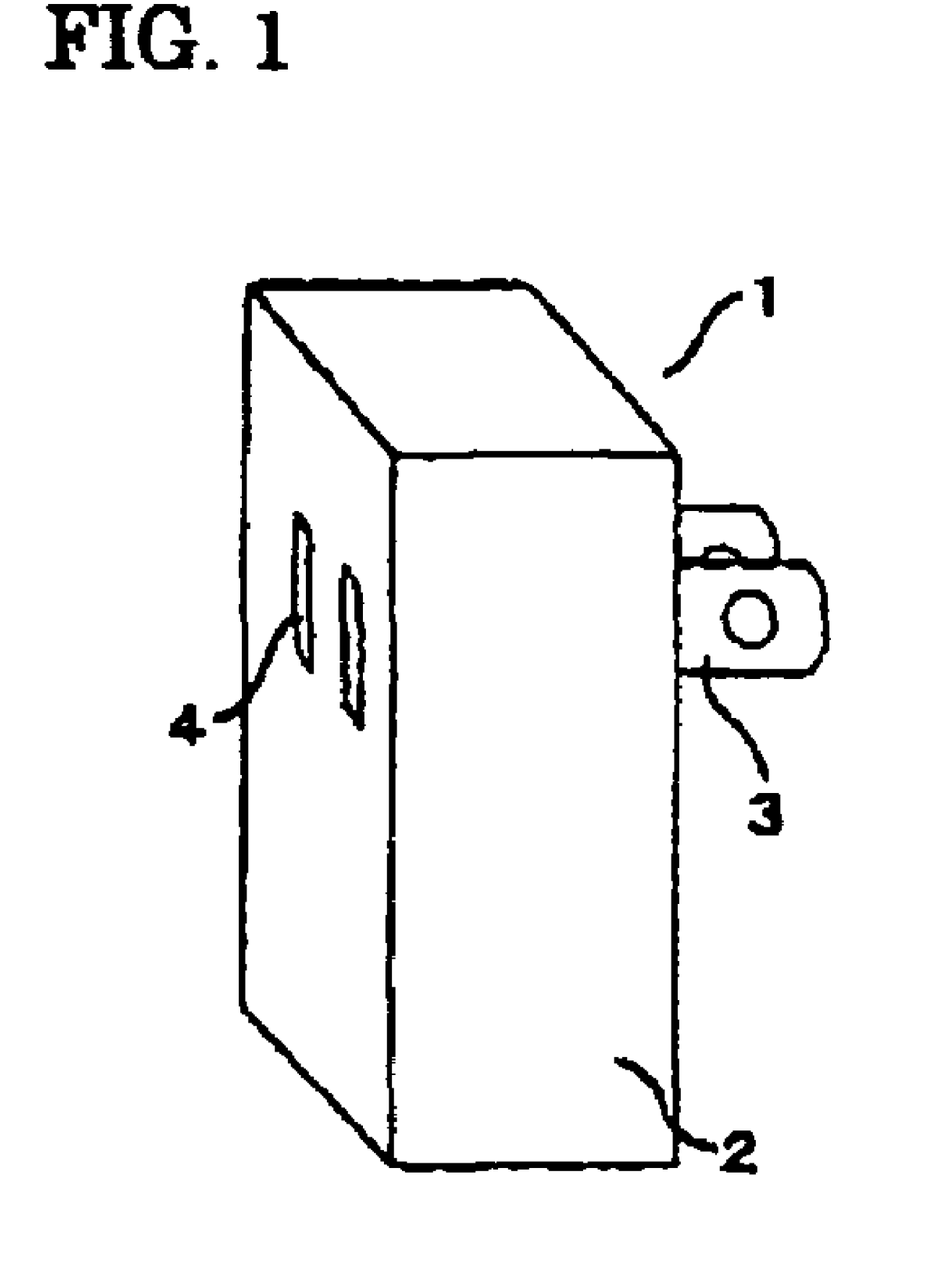
FIG. 1 is a view illustrating the outlet tap of the present invention in appearance.

Modes for carrying but the present invention will be described with reference to the accompanying drawings. FIG. 1 is a view illustrating the outlet tap of the present invention in appearance.

An outlet tap 1 is provided with a casing 2, a power source plug 3 and a cord not shown. The cord is provided in the interior of the casing 2. An outlet 4 is oppositely disposed from the power source plug 3 in the casing 2. The outlet 4 is connected with the power source plug 3 through a cord in the interior of the casing 2. The outlet 4 is adapted to be connected with a power source plug of an electrical appliance in use. On the other hand, the power source plug 3 is connected with a domestic commercial power source.

Figure 2:
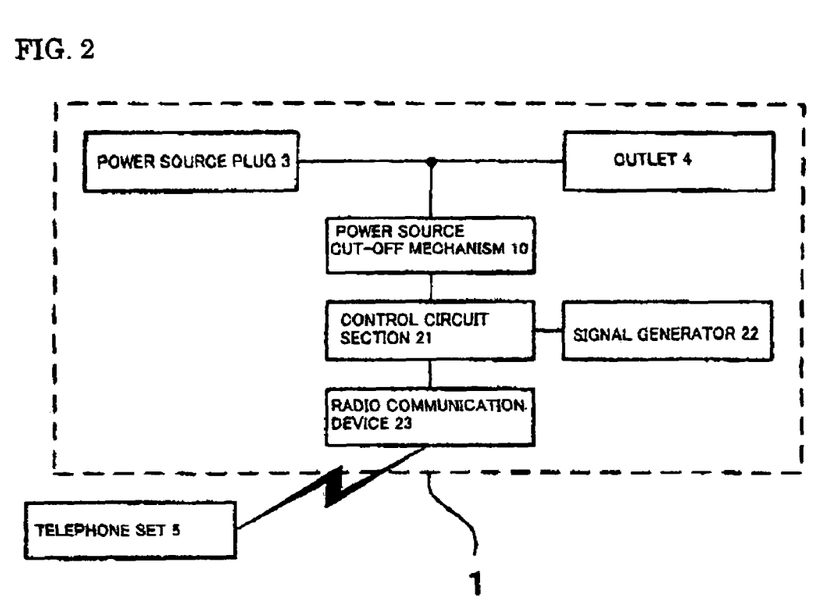
FIG. 2 is a block diagram of the outlet tap of the present invention, illustrating the interior of the tap in construction.

The outlet tap 1 further comprises in construction inside the casing 2 various sections such as: a radio communication device 23; a control circuit section 21; a power source cut-off mechanism 10; a signal generator 22; and, like sections (see FIG. 2).

The radio communication device 23 receives a control signal. This control signal is issued from a telephone set 5 and transmitted through an MCA (i.e., Micro Channel Architecture) radio 6 (see FIG. 3). Further, the radio communication device 23 transfers a control signal generated in the signal generator 22 to the telephone set 5.

The control circuit section 21 issues a control signal to the power source cut-off mechanism 10 on the basis of a control signal which is issued from the telephone set 5 to the control circuit section 21 through the radio communication device 23, so that the power source cut-off mechanism 10 is controlled in operation. On the other hand, the signal generator 22 transmits the result of a power source cut-off operation of the power source cut-off mechanism 10 to the telephone set 5 through the radio communication device 23.

The power source cut-off mechanism 10 is connected with the control circuit section 21 to perform a power source cut-off operation of the outlet 4 on the basis of the control signal issued from the control circuit section 21.

Incidentally, each of the radio communication mechanism 23 and the control circuit section 21 is energized upon receipt of electric power supplied from the domestic commercial power source through the power source plug 3.

Figure 3:
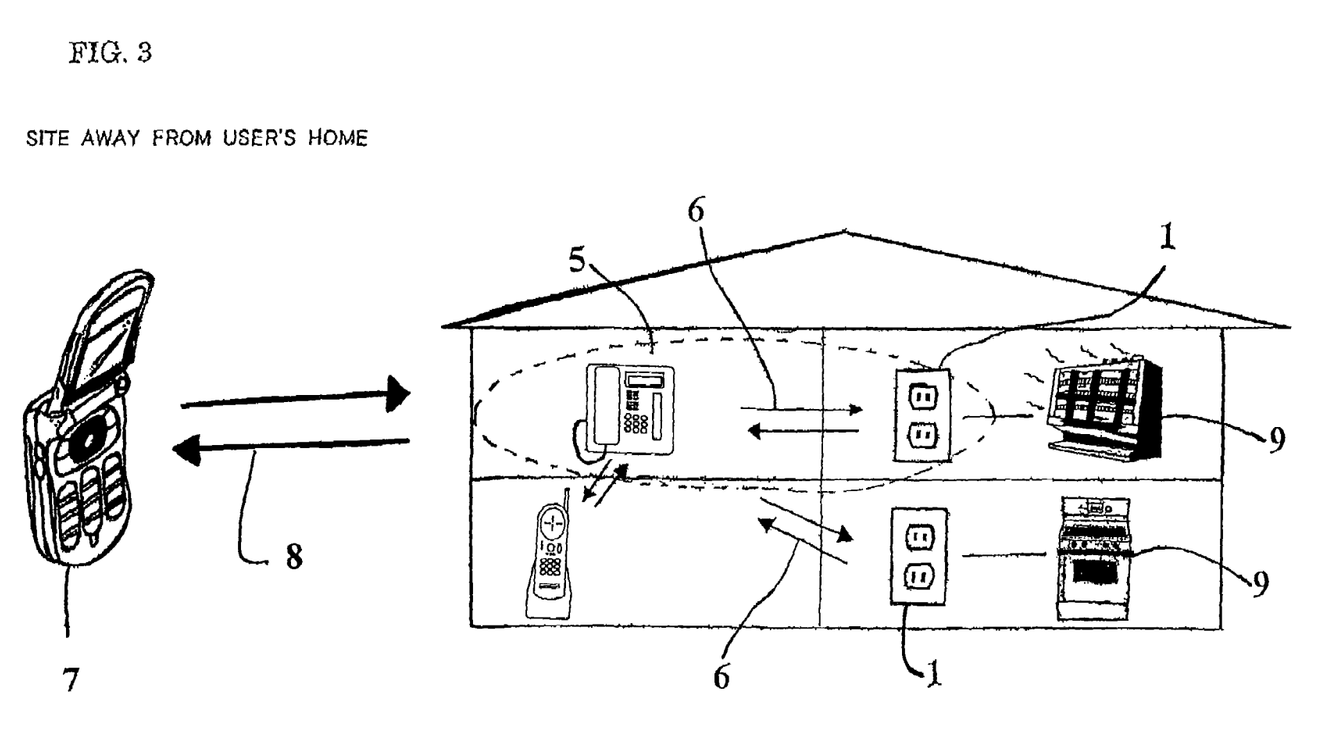
FIG. 3 is a view of a first embodiment of the outlet tap of the present invention, illustrating the tap in construction.

FIG. 3 is a view of a first embodiment of a power source cut-off system of the present invention, illustrating the system in construction. The power source cut-off system of the present invention is constructed of the telephone set 5; and, a plurality of the outlet taps 1 each connected with, the telephone set 5 through the radio line 6.

The telephone set 5 receives a control signal issued from an external communication instrument 7 through a telephone line 8. On the basis of this control signal thus received, a radio communication is performed between the telephone set 5 and each of the outlet taps 1 disposed inside the house, so that a plurality of the outlet taps 1 are controlled in operation.

Further, each of various types of the electrical appliances 9 are connected with the domestic commercial power source through the corresponding outlet taps 1. The electrical appliances 9 are ordinarily used inside the house and comprise mainly: an electric heater, an electric cooking stove, an electric iron and like electrical household appliances used at elevated temperature in the house.

The external communication instrument 7 is connected with the telephone set 5 through the telephone line 8 in the site away from the house. It is possible for the user or subscriber to transmit the control signal to the telephone set 5 from the site away from the house by means of the external communication instrument 7 and also possible to receive information in the site away from the house, wherein the information is transmitted from the telephone set 5 to the site away from the house.

Incidentally, there are a cellular phone, a PHS and like instruments in addition to a public telephone, which instruments serve as the external communication instrument 7. Such external communication instrument 7 enables the user or subscriber to communicate with the telephone set 5 through the telephone line 8 and exchange information between the instrument 7 and the telephone set 5.

An identification code is allocated to each of the outlet taps 1. The corresponding identification code is inherent in each of the outlet taps 1. Consequently, it is possible for each of the telephone set 5 and the control circuit section 21 of each of the outlet taps 1 to identify each of the outlet taps 1 on the basis of the corresponding identification cord.

The telephone set 5 provides, in addition to a function in constituting an ordinary MCA cordless telephone set: a function in automatically receiving and replying to a phone call; a function in identifying the personal identification number or secret number which is recognition means for recognizing the user as an eligible operator for operating the power source cut-off system; a function in receiving the instructions for starting the power source cut-off system; a function in automatically phoning the outlet tap 1; a function in issuing the instructions for interrupting the power source; and, a function in receiving the result of performance of the power source cut-off operation.

Figure 4:
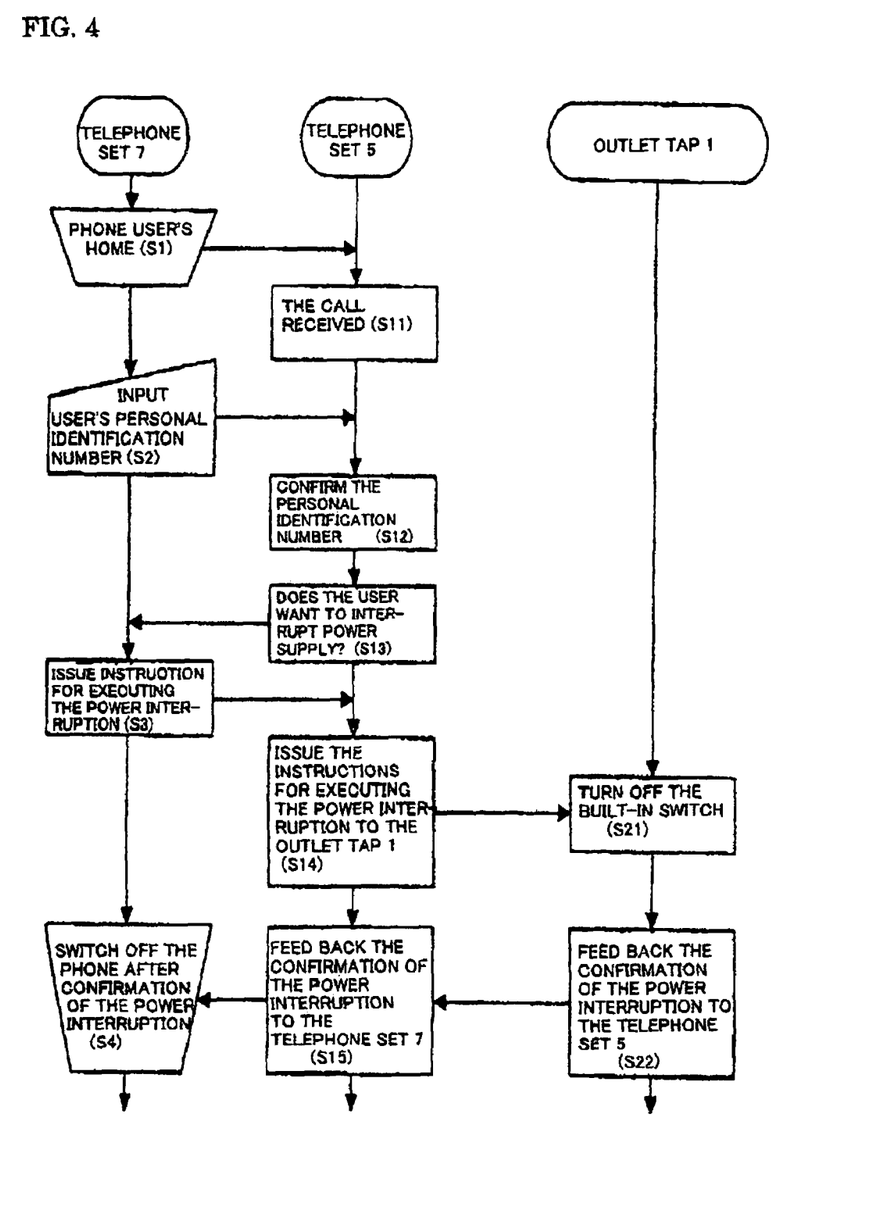
FIG. 4 is a flowchart illustrating the operation of the first embodiment of the power source cut-off system of the present invention.

Next, the power source cut-off system of the present invention will be described with reference to the flowchart shown in FIG. 4. First, when the user makes a phone call to the telephone set 5 in his or her house at a site away from the house (in a step S1), such phone call automatically arrives at the telephone set 5 in the house and is automatically replied (in a step S11). When the user inputs his secret number to the external communication instrument 7 by depressing the buttons of the instrument 7 (in a step S2), the telephone set 5 recognizes such secret number of the user (in a step S12), the user having made the phone call to the telephone set 5.

After completion of the recognition of the user's secret number, the telephone set 5 asks the user's decision as to whether or not the power source of the outlet tap 1 is interrupted (in a step S13). In this case, the telephone set 5 issues a voice message, for example such as "When you wants to interrupt the power source, please depress a button 1. When you do not want to interrupt the power source, please depress a button 2".

In the case where the button 2 is depressed to input the choice denying the interruption of the power source, a series of control steps in operations are completed. On the other hand, when the user makes the interruption of the power source in the outlet tap 1 his or her choice (in a step S3), the telephone set 5 issues a control signal for interrupting the power source of the outlet tap 1 to the outlet tap 1 (in a step S14) so that the power source of the outlet tap 1 is interrupted (in a step S21).

Upon completion of the interruption of the power source of the outlet tap 1, the outlet tap 1 issues a radio signal representing the completion of the interruption of the power source to the telephone set 5 (in a step S22). After that, the telephone set 5 reports the completion of a series of steps in the power source cut-off operation to the outlet tap 1 (in a step S15). This makes it possible for the user to confirm the completion of the power source cut-off operation and to switch off the phone call (in a step S4).

Figure 5:
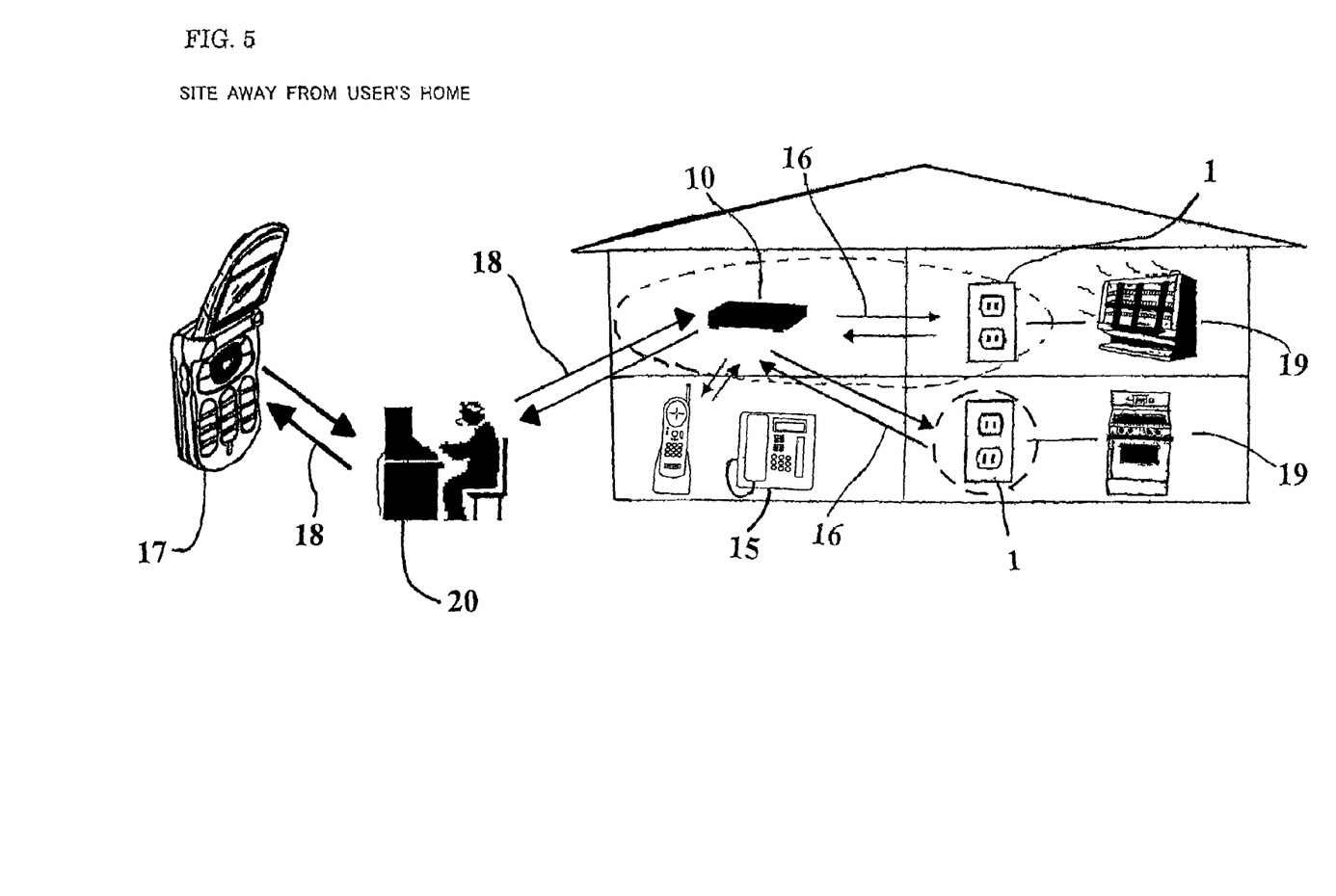
FIG. 5 is a view of a second embodiment of the power source cut-off system of the present invention, illustrating the system in construction.

FIG. 5 is a view of a second embodiment of the power source cut-off system of the present invention, illustrating the system in construction. In FIG. 5, the reference numeral 19 denotes the electrical appliance. For example, such electrical appliance comprises: an electric cooking stove, an electric iron and like electrical household appliances. The reference numeral 10 denotes the power source interrupting or cut-off device installed in the user's house.

This power source cut-off device 10 issues a control signal to each of the outlet taps 11 to automatically control these outlet taps 11. Both the power source cut-off device 10 and each of the outlet taps 11 transmit and receive information through the radio line 16.

The reference numeral 20 denotes a call center. This call center 20 has the subscribers' data controlled in its database server. The subscriber's data corresponds to the subscribers of the present system so that all the telephone numbers, secret numbers and the like of the subscriber's house have been set in the database server. The database server is a server for controlling the subscriber's data to form a part of the call center 20. The call center 20 issues a phone call to the power source cut-off device 10 through the radio line 18. This phone call is made according to the instructions issued from the user.

Next, this embodiment will be described in operation. First, the subscriber's data of the subscriber is registered in the call center 20. This registration is carried out by registering both the telephone number of the subscriber's house and the secret number of the user in the call center 20.

In getting access to the call center 20 by means of the external communication instrument 7, the subscriber phones to a telephone number of the call center 20. Then, the automatic voice reply device of the call center 20 asks the user to input his or her secret number to the call center 20 through the external communication instrument 7.

In reply to the above request, the subscriber inputs his or her secret number to the call center 20 after completion of the automatic voice reply or guide. Judging from the result of such input operation, the database server begins to search the corresponding subscriber's data among a plurality of the subscriber's data in the database server. Then, the result of such search is stored in a CTI (i.e., Computer Telephony Integration) server.

After completion of the search for the subscriber's data, the call center 20 issues a phone call to the telephone set of the subscriber's house according to the contents of the subscriber's data. After that, the power source cut-off device 10 automatically controls the outlet tap 1 on the basis of the telephone number from which the phone call is issued. Incidentally, when the telephone numbers are restricted to those accessible to the call center 20, it is convenient for the user to keep the security in his or her house.

In the case where an incoming phone call arrives at the user's house from some telephone number other than those previously set in the call center 20, such a phone call is transferred to the telephone set 15 connected with the power source cut-off device. On the other hand, in case that the incoming phone call arrives at the user's house from any one of the telephone numbers previously set in the call center 20, the power source cut-off device 10 issues the control signal to the outlet tap 11, so that the power source cut-off operation is carried out to interrupt the power source of the outlet tap 11.

Upon completion of the power source cut-off operation of the outlet tap 11, the outlet tap 11 issues a radio signal to the power source cut-off device 10 to report the completion of the power source cut-off operation to the device 10. After that, the power source cut-off device 10 reports, to the call center 20, the completion of a series of the power source cut-off operations conducted on the outlet tap 11. Then, the call center 20 informs the user that the interruption of the power source in the outlet tap 11 is completed.

Incidentally, the present invention is not limited to the contents of the above embodiment in mode. In other words, it is possible for those skilled in the art to appropriately modify the embodiments if necessary within the scope of the present invention For example, it is possible for the user to remotely switch on the power source. This is convenient for the user resident in cold climates, for example. More particularly, the user may previously switch on the power source of an electrical heating apparatus in his or her house before he or she arrives the house so as to keep the house warm when he or she arrives the house.

INDUSTRIAL APPLICABILITY

As described above, according to the outlet tap, the power source cut-off system and the power source cut-off method of the present invention: the outlet tap is controlled by means of the telephone set based on the identification code; and, further it is possible to perform the power source cut-off operation of each of the outlet taps through the radio signal even when the telephone set is placed in a site away from the outlet tap. Due to this, the outlet tap is effective in use.

Further, it is possible for the user or subscriber to interrupt the power source of each of a plurality of the outlet taps of his or her house through the telephone line even when the user or subscriber is in a site away from his or her house. Consequently, it is possible for the user or subscriber to control the power source of his or her, own house even when he or she is in a site away from the house. For example, in the case where the user or subscriber fails to turn off the power source of his or her electrical appliance or is not sure about completion of the power source cut-off operation of the electrical appliance when the user or subscriber is away from the house, there is no fear that the power source of the electrical appliance in the house remains in its turned-on state or can't be cut off by the user or subscriber.

Particularly, in the case where the electrical appliance the power source of which the user or subscriber fails to cut off generates an intense heat in operation, it is possible for the present invention to prevent an unexpected misfortune from occurring based on such intensive heat generated in operation of the electrical appliance. Due to this, it is possible for the present invention to prevent a fire from breaking out in the house. Due to this, the present invention has the effect of preventing a fire from breaking out in the house of the user or subscriber to secure the safety of the house.

The invention claimed is:

1. A power source cut-off system constructed of: an outlet tap which is connected with a domestic commercial power source to supply electric power to an electrical appliance; and, a telephone set connected with an external telephone line to control said outlet comprising: an outlet with which said electrical appliance is connected; a power source cut-off device for interrupting said power source at said outlet; a receiver means for receiving a radio signal issued from said telephone set; and, a control means for controlling said power source cut-off device on the basis of said radio signal having been received in said receiver means, and wherein said telephone set includes: a control signal receiver means for receiving a control signal having been transmitted through said external telephone line; and, a transmitter means for transmitting said radio signal to said outlet tap on the basis of said control signal receiver means.

2. The power source cut-off system as set forth in claim 1, wherein said outlet tap further comprises: a signal generator means for showing the result of power source cut-off operation carried out with respect to said electrical appliance at said outlet; and, a transmitter means for transmitting said radio signal representing the result of said power source cut-off operation to said telephone set, wherein said telephone set further comprises a receiver means for receiving said radio signal having been transmitted from said transmitter means of said outlet tap.

3. The power source cut-off system as set forth in claim 1, wherein said telephone set further comprises: a voice guide choosing means for choosing a voice guide in report of the result in analysis of the result of said power source cut-off operation on the basis of said radio signal having been received in said receiver means, said power source cut-off operation being conducted in said outlet of said outlet tap; and, a playback means for reproducing said voice guide, wherein said voice guide reports said result to a user having been selected by said voice guide choosing means.

4. A power source cut-off system constructed of: an outlet tap which is connected with a domestic commercial power source to supply electric power to an electrical appliance; and, a telephone set connected in between an external telephone line and a telephone set to control said outlet tap comprising: an outlet with which said electrical appliance is connected; a power source cut-off device for interrupting said power source at said outlet; a receiver means for receiving a radio signal issued from said power source cut-off device; and, a control means for controlling said power source cut-off device on the basis of said radio signal having been received in said receiver means, and wherein said power source cut-off device includes: a control signal receiver means for receiving a control signal having been transmitted through said external telephone line; and, a transmitter means for transmitting said radio signal to said outlet tap on the basis of said control signal receiver means; and, wherein said outlet tap includes: a signal generator means for showing the result in power source cut-off operation of said electrical appliance conducted at said outlet; and, a transmitter means for radio transmitting a radio signal representing said result in power source cut-off operation to said power source cut-off device, said radio signal representing said result in power source cut-off operation being prepared in said signal generator means, wherein said power source cut-off device further includes a receiver means for receiving said radio signal issued from said transmitter means of said outlet tap.

5. The power source cut-off system as set forth in claim 4, wherein said power source cut-off device further comprises: a voice guide choosing means for choosing a voice guide in report of the result in analysis of the result of said power source out-off operation on the basis of said radio signal having been received in said receiver means, said power source cut-off operation being conducted in said outlet of said outlet tap; and, a playback means for reproducing said voice guide, wherein said voice guide reports said result to a user having been selected by said voice guide choosing means.

6. The power source cut-off system as set forth in claim 4, wherein said power source cut-off device comprises: a phone-call reply means for replying a phone call; a confirmation means for confirming whether or not said phone call contains a preset power source cut-off number in reply to said phone call; and, a power source cut-off operation carrying out means for carrying out said power source cut-off operation on the basis of said phone call in the case where said phone call contains said preset power source cut-off number which is confirmed by said confirmation means.

7. A power source cut-off system includes: an outlet tap which is connected with a domestic commercial power source to supply electric power to an electrical appliance; and, a telephone set connected with an external telephone line to control said outlet tap, wherein said outlet tap comprises: an outlet with which said electrical appliance is connected; a power source cut-off device for interrupting said power source at said outlet; a radio receiver which receives a radio signal issued from said telephone set; and, a control circuit section which controls said power source cut-off device on the basis of said radio signal having been received by said radio receiver, and wherein said telephone set includes: a control signal receiver for receiving a control signal having been transmitted through said external telephone line; and, a transmitter which transmits said radio signal to said outlet tap on the basis of said control signal receiver.

8. The radio receiver of claim 7, wherein said receiver comprises a radio communication device.

* * * * *